(12) United States Patent
Wieczorek

(10) Patent No.: US 11,082,590 B2
(45) Date of Patent: Aug. 3, 2021

(54) CAMERA DEVICE, REAR VIEW DEVICE AND MOTOR VEHICLE

(71) Applicant: SMR Patents S.à.r.l., Luxembourg (LU)

(72) Inventor: Romeo Wieczorek, Stuttgart (DE)

(73) Assignee: SMR Patents S.à.r.l., Luxembourg (LU)

( * ) Notice: Subject to any disclaimer, the term of this patent is extended or adjusted under 35 U.S.C. 154(b) by 0 days.

(21) Appl. No.: 16/634,453

(22) PCT Filed: Jul. 25, 2018

(86) PCT No.: PCT/EP2018/070224
§ 371 (c)(1),
(2) Date: Apr. 21, 2020

(87) PCT Pub. No.: WO2019/020713
PCT Pub. Date: Jan. 31, 2019

(65) Prior Publication Data
US 2020/0252528 A1 Aug. 6, 2020

(30) Foreign Application Priority Data

Jul. 28, 2017 (DE) ...................... 10 2017 117 153.3

(51) Int. Cl.
*H04N 5/225* (2006.01)
*B60R 1/00* (2006.01)
*B60R 11/04* (2006.01)

(52) U.S. Cl.
CPC ........... *H04N 5/22521* (2018.08); *B60R 1/00* (2013.01); *B60R 11/04* (2013.01); *H04N 5/2252* (2013.01); *H04N 5/2257* (2013.01); *B60R 2300/8046* (2013.01)

(58) Field of Classification Search
CPC ............. H04N 5/22521; H04N 5/2252; H04N 5/2257; B60R 1/00; B60R 11/04
See application file for complete search history.

(56) References Cited

U.S. PATENT DOCUMENTS

| | | | |
|---|---|---|---|
| 9,623,799 B2 | 4/2017 | Bingle et al. | |
| 2015/0321621 A1 | 11/2015 | Van Dan Elzen et al. | |
| 2017/0124987 A1* | 5/2017 | Kim | B60R 11/04 |
| 2018/0017785 A1* | 1/2018 | Bulgajewski | H04N 5/2252 |
| 2018/0346668 A1* | 12/2018 | Ichikawa | C25D 11/02 |

FOREIGN PATENT DOCUMENTS

| | | |
|---|---|---|
| DE | 10340900 A1 | 3/2005 |
| WO | WO 2016/105674 A1 | 6/2016 |

OTHER PUBLICATIONS

International Search Report dated Dec. 4, 2018 of International application No. PCT/EP2018/070224.
Written Opinion dated Dec. 4, 2018 of International application No. PCT/EP2018/070224.

* cited by examiner

*Primary Examiner* — Mishawn N. Hunter
(74) *Attorney, Agent, or Firm* — Jones Day

(57) ABSTRACT

A camera device includes a housing, in which at least one camera module is at least partially arranged and which carries at least one light window in the beam path of the camera module, at least one air chamber being arranged between the light window and the camera module in the housing, and the housing having an electroconductive plastic that heats the light window and/or the air chamber when current is applied thereto.

18 Claims, 1 Drawing Sheet

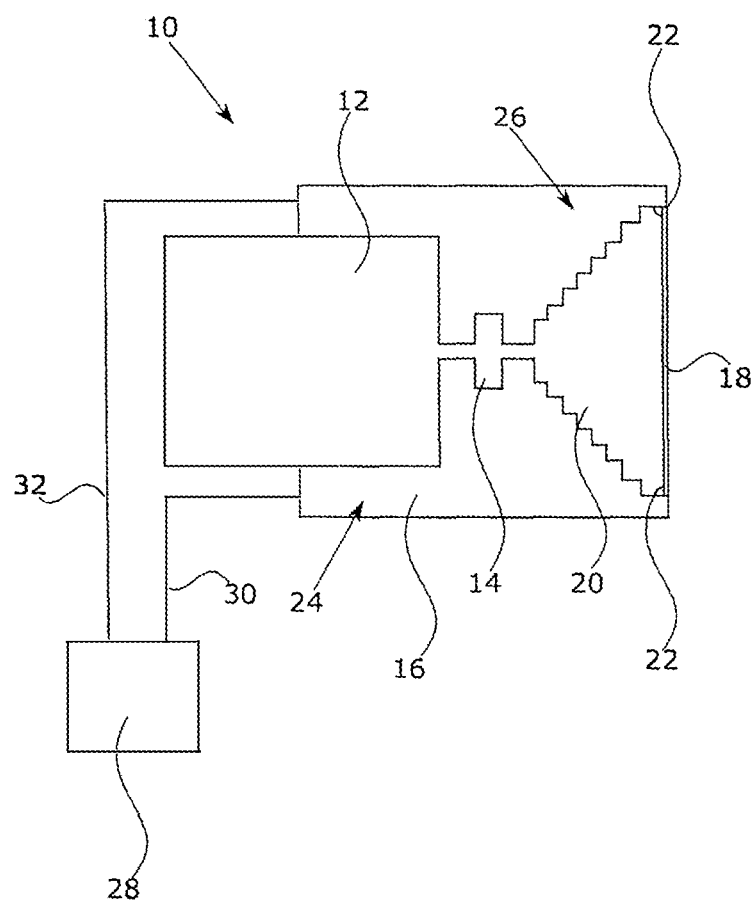

CAMERA DEVICE, REAR VIEW DEVICE AND MOTOR VEHICLE

CROSS-REFERENCE TO RELATED APPLICATIONS

This application is a National Stage Entry of International Patent Application No. PCT/EP2018/070224, filed Jul. 25, 2018, which claims the benefit of foreign priority to German Patent Application No. DE 10 2017 117 153.3, filed Jul. 28, 2017, each of which is hereby incorporated by reference in its entirety for all purposes.

BACKGROUND

1. Field of the Invention

The present disclosure relates to a camera device as well as a rearview device and a motor vehicle having such a camera device.

2. Related Art

Cameras which are intended to supply the driver with additional information or provide data for driver assistance systems are increasingly being used in modern motor vehicles. Said cameras can be front-view cameras, rearview cameras for replacing rearview mirrors, cameras for observing a blind spot of another rearview system, rear cameras or the like.

A rearview device for a motor vehicle supplies an image of the rear region of the motor vehicle, which corresponds at least to the statutory regulations and belongs to a subgroup of devices for indirect vision. These supply images and views of objects which are not located in the direct field of view of a driver, that means in directions opposite to, to the left of, to the right of, below and/or above the driver's viewing direction. In particular, it is possible that the driver's view is not completely satisfactory, including in the viewing direction. For example, views can be obstructed by parts of the vehicle itself such as, for example, by parts of the body, in particular the A-pillar, the roof construction and/or the hood, and views can be obstructed by other vehicles and/or objects outside the vehicle, which can hinder the vision such that the driver cannot detect a driving situation completely satisfactorily or respectively can only detect the driving situation incompletely. Moreover, it is possible that the driver is not able to detect the situation which is present in or remote from the viewing direction in the way that would be necessary in order to control the vehicle in accordance with the situation. Therefore, a rearview device can also be designed such that it processes the information in accordance with the abilities of the driver in order to make it possible for him to detect the situation in the best possible manner.

Various functions and units can be installed in rearview devices and/or controlled with the aid of rearview devices, with cameras in particular also being included. Functions and units for improving, extending and/or maintaining the functionality of the rearview device in normal or extreme conditions are particularly useful. These can include heating and/or cooling apparatuses, cleaning agents such as wipers, liquid and/or gaseous sprays, actuator means for moving the rearview device or parts thereof such as, for example, a display, a camera system and/or parts of a camera system including, for example, lenses, filters, light sources, adaptive optics such as, for example, deformable mirrors, sensors and/or mirrors, and/or actuator means for inducing movements of other objects, for example parts of the vehicle and/or objects which surround the vehicle.

Furthermore, the rearview device can include linear guides and/or rotating wheels such as, for example, a filter wheel, for replacing optic elements, for example including lenses, mirrors, light sources, sensors, adaptive optics such as deformable mirrors and/or filters.

Further apparatuses can be integrated into rearview devices, and/or further apparatuses can be controlled with the aid of rearview devices such as, for example, any type of light module, including an external light module, an internal light module, a front light, a taillamp, a fog lamp, a brake light, an acceleration light, a flashing light, a logo light, an apron lighting, a floor light, a puddle light, a flashlight, a navigation light, a positional light, an emergency light, a headlight, a green light, a red light, a warning light, a light module for a flashing light, an approach light, a searchlight, an information light, a display and/or the like. Further examples of functions and devices which can be integrated into rearview devices and/or controlled with the aid of rearview devices can be, for example, a driver drowsiness detection system, a microsleep detection system, a distance and/or speed determination system, for example a LIDAR (Light Detection and Ranging) system, a blind spot indication system, a lane change assistance system, a navigation assistance system, a tracking assistant system, a human-machine interaction system, a machine-machine interaction system, an emergency and precautionary measures assistance system such as an accident prevention assistance system, a countermeasures assistance system, a braking assistance system, a steering assistance system, an acceleration assistance system, an escape assistance system which includes, for example, an ejector seat system, a direction indicator, a blind spot indicator, an approach system, an emergency braking system, a charge status indicator, a vehicle mode system which includes, for example, a sport mode system, an economy mode system, an autonomous driving mode system, a sleep mode system and/or an anti-theft system, a vehicle-locked indication system, a vehicle-stolen display, a warning signal system, a temperature indicator system, a weather indication system, a traffic light signaling system, a fuel status system and/or any combination thereof.

Lighting apparatuses for rearview devices and/or optical fibers for these are described in German patent application No. 102012108488, in German patent application No. 102012104529, in German patent application No. 102012107833, in German patent application No. 102012107834, in European patent No. 2738043, in European patent No. 2947378, in the international patent application No. 2015/173695, in European patent application No. 3045944, in U.S. patent application Ser. No. 15/228,566, in U.S. patent application Ser. No. 15/000,733, in the international patent application No. 2016/147154, in U.S. patent application Ser. No. 15/256,532, in German patent application No. 102015115555, in European patent application No. 3144183, of the applicant.

A camera module can in particular have a plurality of various optic elements which includes, among others, a plurality of various sensors and light sources as well as housing parts. The housing of a camera module can be manufactured from plastic, metal, glass, another suitable material and/or from any combination thereof and can be used in combination with the techniques described below for altering or modifying the properties of the material or the material surface. Housings are described, for example, in German patent application No. 102016108247.3.

The camera can, for example, include CCD or CMOS or light field sensors, as described, for example, in German patent application No. 102011053999 and U.S. Pat. No. 6,703,925. A region of the sensor can also be reserved for various purposes in order to detect, for example, a test beam, as disclosed in U.S. Pat. No. 8,031,224.

The optic elements can be shaped or fashioned from any type of glass or any other suitable material. Glass is used here in the sense of a non-crystalline amorphous solid which shows a glass transition when it is heated in the direction of the liquid condition. It includes, for example, the group of the polymer glasses, metal glasses and silicon dioxide glasses, but any other suitable material that shows the glass transition can likewise be used. The glass can be either flat, wedge-shaped, rectangular, cylindrical, spherical, conical, elliptical and/or circular, as described, for example, in German patent application No. 102016108247.3 and German patent application No. 102011103200, or can have a shape in accordance with the different needs or lens types. By way of non-restrictive examples, camera modules can be equipped with lenses such as, by way of example, a wide-angle or a fisheye lens which is suitable for providing peripheral images, as described in U.S. patent application Ser. No. 15/281,780 and U.S. patent application Ser. No. 13/090,127, a Fresnel lens or microlenses, as described in German patent application No. 102011053999, or a TIR (Total Internal Reflection lens), as described in U.S. Pat. No. 8,740,427. Another type of optic elements which are known to be used in camera modules are optical fibers, in particular in the form of fiber bundles and, preferably, in the form of fiber bundles having an optical head, as described, for example, in US. patent application Ser. No. 09/771,140. Various methods can be used in order to manufacture such optic elements such as, for example, the method which is described in U.S. Pat. No. 8,460,060. The optic elements can be transparent as described, for example, in U.S. Pat. No. 8,031,224, German patent application No. 102016108247.3 and U.S. patent application Ser. No. 13/242,829. However, the optic elements can also be semi-transparent, as described in U.S. patent application Ser. No. 09/771,140 and U.S. patent application Ser. No. 13/090,127. Furthermore, the optic elements can be completely or partially coated with different types of coatings in order to realize different effects such as, for example, antireflection coatings, see U.S. Pat. No. 8,031,224, chromium-based reflection coatings, see U.S. Pat. No. 9,181,616, and other coatings as described, for example, for polymeric substrates in U.S. patent application Ser. No. 14/936,024 and in U.S. patent application Ser. No. 15/124,310. The optic elements preferably consist of a scratch-resistant material, as described, for example, in German patent application No. 102016108247.3. The optic elements can have decoupling structures at specific points of the optic elements, and an optical film, for example an extruded film, and a shaped coating, as described in German patent application No. 102011103200, can be applied. A coating for spectral and voltage control is described in U.S. patent application Ser. No. 15/124,310. Various filters can be integrated into the optic elements such as, for example, gray filters or polarization filters which are described in U.S. patent application Ser. No. 14/809,509. Electrochromic substrates, polymer electrolytes and other charge-conducting media can be included for the optic elements on the basis of the descriptions, as disclosed in European patent application No. 08103179.1, European patent No. 2202826, U.S. Pat. Nos. 7,999,992 and 8,537,451.

The camera module can also be equipped with units for regulating the light intensity, as described, for example, in U.S. patent application Ser. No. 14/809,509, and can have light level intensifier tubes as described in U.S. patent application Ser. No. 09/771,140. The electrochromic substrates and devices, which are used in European patent application No. 08103179.1, European patent No. 2202826, U.S. Pat. Nos. 7,999,992 and 8,537,451, can also be used for this purpose, as can a transflector for transmitting or reflecting light on the basis of an appropriate input signal, as described in German patent application No. 102016106126.3.

The camera module or a cover adapted to the camera module can be moved with various actuators, drives and/or a flexible track, as described, for example, in German application No. 102016108247.3 and U.S. patent application Ser. No. 15/281,780. Furthermore, the camera module can also include cleaning elements in order to clean the outwardly pointing optic element which is exposed to the environment. The cleaning element can, for example, contain wipers, brushes, lips, nozzles, fans and similar elements as described in European patent application No. 14165197.6, U.S. patent application Ser. No. 15/281,780, German patent application No. 102016108247.3, European patent application No. 13163677.1, European patent application No. 15173201.3 and European patent No. 1673260. The cleaning devices are not restricted in their composition and can, for example, include any fabrics, elastomers, sponges, brushes or combinations thereof. Special wiper elements, which include wiper arms, wiper blades, wiping cloths, wiping fabrics and combinations thereof, are described in European patent application No. 14165197.6. A wiper element can be controlled, for example, in accordance with the method described in European patent application No. 130164250.6. A reservoir for holding a cleaning fluid, as described in European patent application No. 14165197.6, can be mounted on the camera module or integrated into said camera module, in order to feed the cleaning fluid to the optic elements of the camera module.

Various methods can be used in order to identify dirt or other misting which prevents or impairs the functioning of the camera module, as described in U.S. Pat. No. 8,395,514, European patent No. 1328141, and U.S. Pat. No. 8,031,224. Light sources can also be installed in or integrated into the camera module, in order to increase the visibility of surrounding objects, to measure distances and directions and to identify dirt, as described in U.S. Pat. No. 8,031,224, U.S. patent application No. 62/470,658 and U.S. patent application Ser. No. 09/771,140.

The concept of providing heating devices for such cameras or respectively protective glasses is known. To this end, heating foils are, for example, bonded to the protective glass or laminated thereto. One such solution is expensive to manufacture and only has a low heating power, due to the low thermal mass of such a heating foil. Various heating means such as heating coils, heating devices integrated into the lens holder or the surround, or other heating elements can be used, in order to prevent condensation and icing on the surface of optic elements as described, for example, in German patent application No. 102016108247.3 and U.S. patent application No. 62/470,658.

Water-tight sealings against weather effects as well as against the influence of washing processes with detergents, solvents and high-pressure cleaners can be used on the housing of the camera module as described, for example, in U.S. patent application Ser. No. 13/090,127. Alternatively, the housing can be manufactured from a body which consists of plastic and conductive material, the conductive material being distributed in the plastic material, in order to form a conductive mass, in order to allow a power source, preferably a DC voltage source, to enter into a connection with the body by means of at least two electrodes and to heat the body accordingly. A conductive track can be embedded in plastic parts of the camera module, as described in European patent No. 1328141 and U.S. Pat. No. 7,083,311.

The camera module can include an energy collecting system as described, for example, in European patent application No. 09171683.7. An error detection system for electrical consumers, as described in U.S. Pat. No. 8,487,633, can be used in order to detect a failure of the camera module.

Various types of fastenings can be used in order to fasten the camera module to the vehicle or other components such as, by way of example, the snap-in connection which is described in European patent No. 2233360.

Various control means and analyzing devices can be used such as, for example, the calculation units which are described in U.S. patent application Ser. No. 13/090,127, German patent application No. 102016106126.3, German patent application No. 102011053999, European patent specification No. 2146325 and U.S. Pat. No. 8,849,104. The HDR (High Dynamic Range) technology according to U.S. patent application Ser. No. 14/830,40 can additionally be used.

SUMMARY

In an aspect, a camera device is provided with a housing, in which at least one camera module is at least partially arranged and which carries at least one light window in the beam path of the camera module, at least one air chamber being arranged between the light window and the camera module in the housing, and the housing having an electroconductive plastic that heats the light window and/or the air chamber when current is applied thereto. The air chamber can be provided by the housing such that it conically tapers away, from the light window, in at least one cutting plane.

The housing can include at least a first partial region of an electroconductive plastic and at least a second partial region of a non-electroconductive plastic; or the housing can be manufactured from a plastic having an electroconductive supplementary material, and the filling degree of the supplementary material in at least one first partial region can be greater than in at least one second partial region, the supplementary material preferably comprising graphite and/or carbon fibers. In addition, the housing can be embodied as an injection-molded part, in particular as a two-component injection-molded part.

It is preferable that the light window is a protective glass which preferably seals, in particular in an impervious manner, the housing at least on a side opposite the camera module. A connecting region, in particular an adhesive region, between the housing and the light window, in particular the protective glass, can be arranged in the second partial region. The seal can be fixedly connected to the housing, in particular manufactured using a 2-component injection-molding process, or the seal can be connected, in particular detachably, to the housing by means of a snap-in and/or latching connection. It is further preferred that the protective glass is connected, in particular detachably, to the housing and/or the seal by means of a snap-in and/or latching connection, and/or the housing provides at least one undercut and/or at least one clip element for holding the protective glass.

It is further proposed with the invention that the air chamber is provided by the housing such that it conically tapers away from the light window in at least one cutting plane.

At least one lens can also be arranged in the beam path of the camera module in the housing. The lens can be arranged in the beam path of the camera module in front of the air chamber.

Embodiments of the invention are also characterized in that a power supply is provided in order to apply electrical current to the electroconductive plastic, in particular by applying electrical current to the first partial region of the housing. It can be provided that the power supply is designed to provide a pulse-width modulated current, or a control apparatus is connected to the power supply for a pulse-width modulated control.

At least one sensor apparatus can further be provided in order to determine the temperature, in particular of the light window and/or of the air chamber, preferably in operative connection with the power supply and/or the control apparatus. It is preferable that the heat input into the light window and/or the air chamber can be determined by means of the resistance of the electroconductive plastic and/or of the housing, in particular of the first partial region of the housing, and/or can be utilized in order to control the power supply. It has proven to be advantageous that a temperature-dependent internal resistance of the housing, in particular of the first partial region of the housing, can be determined by means of the power supply and/or the control apparatus, and electrical current can be applied to the housing, in particular the first partial region of the housing, as a function of the determined internal resistance.

Furthermore, it is preferred that at least one lens hood is provided by the housing, in particular by the restriction of the air chamber.

A camera device according to the invention is in particular embodied as an external camera for a motor vehicle and includes an objective and a protective glass arranged in the beam path of a camera module in front of the objective, which is held by a housing, which in turn embodies a closed-off air chamber between the objective and the protective glass, the housing being at least partially formed by an electroconductive plastic.

Since the electroconductive plastic has a given internal resistance, like any conductor, heat loss occurs during energization of the electroconductive plastic. The housing itself can therefore be utilized as a heating element in order to protect the protective glass against fogging and icing. Additional heating foils or similar heating elements are not necessary so that the camera device according to the invention is particularly simple and inexpensive to manufacture. In addition, the electroconductive plastic has a greater thermal mass than standard heating foils so that a particularly good heating power is attained and a desired temperature can be held for a particularly long time. In addition, during energization of the electroconductive plastic, the air in the air chamber also heats up so that a particularly uniform and gentle heating of the protective glass is attained.

If the housing includes at least one first partial region made up of an electroconductive plastic and at least one second partial region made up of a non-electroconductive plastic, the heat distribution in the housing can be adjusted particularly well during energization and the heat generation can be separated from thermally sensitive components of the camera device.

If the housing has at least one first partial region made of a plastic having an electroconductive supplementary material and at least one second partial region made of a plastic having an electroconductive supplementary material, a filling degree of the supplementary material in the first partial region being greater than in the second partial region, the heat distribution in the housing can be adjusted as required. Thanks to the use of plastics having a different supplementary material filling degree, gradients in the internal resistance and, thus, the heat generation can, in addition, be realized, which makes possible a particularly precise control of the heat distribution. Such a housing can also advantageously be generated in a single injection molding step, if the supplementary material is added to a variable extent during the feeding of the injection-molding mass.

It is preferred that the supplementary material includes graphite and/or carbon fibers. Such supplementary materials mix particularly well with standard plastic materials and provide the desired conductivity to an adjustable extent. Of course, the use of other supplementary materials or mixtures having intrinsically conductive plastics such as PEDOT:PSS is also possible as long as the desired conductivity is achieved.

If a connecting region, in particular an adhesive region, is arranged between the housing and the protective glass in the second partial region, which does not have any conductivity or only has low conductivity, also less heat is generated there during the energization of the housing. This protects the sensitive adhesive site from heat, while the protective glass itself can be reliably heated by radiant heat from the first partial region and by the heating of the air chamber.

Embodying the housing as an injection-molded part, in particular as a two-component injection-molded part, makes possible a particularly simple manufacture of the housing. During injection molding, both gradients of supplementary materials and a construction of the housing from, in certain areas, completely different materials can be realized; the latter using the known two-component technology.

If the air chamber is embodied conically and extends from the objective towards the protective glass, the shape of the air chamber corresponds approximately to the beam path of the camera module outside the objective. This keeps the air chamber comparatively small, so that it can heat up quickly. At the same time, this allows a high wall thickness of the housing in the region of the objective, which is associated with a high thermal mass, so that the housing holds a temperature, once it is set, particularly well.

If a power supply is provided in order to apply electrical current to the at least one conductive partial region of the housing, the power supply can be integrated into the camera device or can be provided as an external module. It is hereby preferred that the power supply is designed to provide a pulse-width modulated current. This makes possible a particularly accurate control of the energization of the conductive plastic, which can be quickly and easily adapted to a changed heat requirement.

If the power supply includes a control unit which is designed to determine a temperature-dependent internal resistance of the at least one conductive partial region of the housing and to apply electrical current to the at least one conductive partial region as a function of the measured internal resistance, the at least one conductive partial region of the housing can itself be used, in order to determine the temperature thereof. As a result, additional temperature sensors can be dispensed with, which makes such a camera device particularly easy and inexpensive to manufacture. Thanks to the small number of required components, such a camera device is, in addition, particularly fail-safe.

In another aspect, a rearview device for a motor vehicle as well as a motor vehicle having at least one camera device.

BRIEF DESCRIPTION OF THE DRAWINGS

Preferred embodiments of the present invention are explained in greater detail below, with reference to a schematic drawing, wherein:

FIG. 1 shows a schematic representation of an exemplary embodiment of a camera according to the invention.

DETAILED DESCRIPTION

A camera device, in its entirety is referred to as 10, in particular in the form of an external camera for a motor vehicle, is represented in FIG. 1. It includes the actual camera module 12 with its image capturing apparatus and an objective 14. A housing 16 surrounds at least parts of the camera module 12 and the objective 14. The housing 16 further carries a protective glass 18 which protects the camera module 12 and the objective 14 from environmental effects. An air chamber 20, which extends conically from the objective 14 towards the protective glass 18, is embodied between the objective 14 and protective glass 18 in the housing 16. The side walls of the air chamber 20 simultaneously serve as lens hoods. The protective glass 18 is connected to the housing 16 by means of a bond seam 22.

A first partial region 24 of the housing 16 is produced from a conductive plastic. A second partial region 26 of the housing consists of a plastic which has a lower conductivity than that of the first partial region 24. The conductivity of the partial regions 24, 26 can be effected by different additions of supplementary substances such as graphite or carbon fibers to the plastic mass used for manufacture. Intrinsically conductive plastics can also be used. The second partial region can also be entirely isolating.

In order to manufacture the housing 16 having the two partial regions 24, 26, a two-component injection-molding process can, for example, be used. During this, one of the partial regions 24, 26 is initially injected and, following reconfiguration of the injection mold, for example by shifting a slide, the other partial region 24, 26 is injection molded so that the manufacture of the housing 16 is particularly simple and inexpensive.

The housing 16 can be energized by means of a power source 28 which is connected via leads 30, 32 to the housing 16. Since the conductive plastic has an internal resistance, heat is generated. This heat is radiated via the housing wall into the air chamber 20 and, consequently, indirectly heats the protective glass 18, so that fogging or icing of the protective glass 18 can be avoided or respectively removed.

Since the second partial region 26 of the housing 16 only has low conductivity or does not have any conductivity at all, the current provided preferably flows through the first partial region 24. In the second partial region 26, the housing 16 is therefore only heated a little. This protects the bond seam 22 which may possibly be sensitive to heat.

In order to be able to control the heating of the housing 16 precisely, the power source 28 is preferably designed to provide a pulse-width modulated current. The heating power can consequently be adjusted by means of the duty factor of the current.

In addition, the internal resistance of the housing 16 can be measured by means of the power source 28 and the assigned control electronics. Said internal resistance is temperature-dependent so that the housing temperature can be determined without additional sensors being necessary. This temperature information can have influence on the control of the power source 28 so that the temperature of the housing 16 and, thus, also of the protective glass 18 can be regulated accurately.

All in all, a camera device 10 is thus obtained, which can be reliably protected against fogging and icing with little outlay.

The features of the invention disclosed in the above description, in the drawings as well as in the claims can be material, both individually and in any combination, for the realization of the invention in its various embodiments.

LIST OF REFERENCE NUMERALS

10 Camera
12 Camera module
14 Objective
16 Housing
18 Protective glass
20 Air chamber
22 Bond seam
24 First partial region
26 Second partial region
28 Power source
30 Lead
32 Lead

What is claimed is:

1. A camera device, comprising:
   a housing in which at least one camera module is at least partially arranged and which carries at least one light window in the beam path of the camera module; and
   a protective glass integrally formed with the housing,
   at least one air chamber arranged between the light window and the camera module in the housing, wherein
   the housing comprises an electroconductive plastic that heats at least one of the light window or the air chamber when current is applied thereto, the air chamber being provided so that it conically tapers away from the housing from the light window outwards, in at least one cutting plane,
   the housing is manufactured from a plastic having an electroconductive supplementary material, and the filling degree of the supplementary material in at least one first partial region is greater than in at least one second partial region,
   the supplementary material including at least one of graphite or carbon fibers, and
   the housing itself, at a region of the housing between the protective glass of the camera device and the camera module, is a heating element so that an additional heating foil or heating element is not utilized within the housing.

2. The camera device according to claim 1, wherein the housing is an injection-molded part or a two-component injection-molded part.

3. The camera device according to claim 1, wherein the light window is a protective glass which seals, in an impervious manner, the housing at least on a side opposite the camera module.

4. The camera device according to claim 1, wherein at least one of a connecting region, an adhesive region, or a seal between the housing and the light window or the protective glass is arranged in the second partial region.

5. The camera device according to claim 4, wherein the seal is fixedly connected to the housing or manufactured using a two-component injection-molding process, or the seal is detachably connected to the housing using at least one of a snap-in or latching connection.

6. The camera device according to claim 4, wherein at least one of
   the protective glass is detachably connected to at least one of the housing or the seal by means of a snap-in or latching connection, or
   the housing provides one or more of at least one undercut or at least one clip element for holding the protective glass.

7. The camera device according to claim 1, wherein at least one lens is arranged in the beam path of the camera module in the housing.

8. The camera device according to claim 7, wherein the lens is arranged in the beam path of the camera module in front of the air chamber.

9. The camera device according to claim 8, wherein a temperature-dependent internal resistance of the first partial region of the housing can be determined using at least one of the power supply or the control apparatus, and electrical current can be applied to the first partial region of the housing as a function of the determined internal resistance.

10. The camera device according to claim 1, wherein a power supply is provided in order to apply electrical current to the electroconductive plastic by applying electrical current to the first partial region of the housing.

11. The camera device according to claim 10, wherein the power supply is designed to provide a pulse-width modulated current, or a control apparatus is connected to the power supply for a pulse-width modulated control.

12. The camera device according to claim 1, wherein at least one sensor apparatus is provided in order to determine the temperature of at least one of the light window or of the air chamber, in operative connection with at least one of a power supply or the control apparatus.

13. The camera device according to claim 1, wherein the heat input into the light window or the air chamber is determined using the resistance of the electroconductive plastic or of the housing of the first partial region of the housing, or can be utilized in order to control the power supply.

14. The camera device according to claim 1, wherein at least one lens hood is provided by the housing by the restriction of the air chamber.

15. A rearview device for a motor vehicle having at least one camera device according to claim 1.

16. A motor vehicle having at least one camera device according to claim 1.

17. A camera device, comprising:
   a housing in which at least one camera module is at least partially arranged and which carries at least one light window in the beam path of the camera module; and
   at least one air chamber arranged between the light window and the camera module in the housing, wherein
   the housing comprises an electroconductive plastic that heats at least one of the light window or the air chamber when current is applied thereto, the air chamber being provided so that it conically tapers away from the housing from the light window outwards, in at least one cutting plane,
   the housing is manufactured from a plastic having an electroconductive supplementary material, and the filling degree of the supplementary material in at least one first partial region is greater than in at least one second partial region, supplementary material including at least one of graphite or carbon fibers, wherein at least one of a connecting region, an adhesive region, or a seal between the housing and the light window or the protective glass is arranged in the second partial region, and wherein at least one of the protective glass is detachably connected to at least one of the housing or the seal by means of a snap-in or latching connection, or the housing provides one or more of at least one undercut or at least one clip element for holding the protective glass.

18. A camera device, comprising:

a housing in which at least one camera module is at least partially arranged and which carries at least one light window in the beam path of the camera module; and at least one air chamber arranged between the light window and the camera module in the housing, wherein the housing comprises an electroconductive plastic that heats at least one of the light window or the air chamber when current is applied thereto, the air chamber being provided so that it conically tapers away from the housing from the light window outwards, in at least one cutting plane, the housing is manufactured from a plastic having an electroconductive supplementary material, and the filling degree of the supplementary material in at least one first partial region is greater than in at least one second partial region, and the supplementary material including at least one of graphite or carbon fibers, a power supply is provided in order to apply electrical current to the electroconductive plastic by applying electrical current to the first partial region of the housing, and the power supply is designed to provide a pulse-width modulated current, or a control apparatus is connected to the power supply for a pulse-width modulated control.

* * * * *